(12) United States Patent
Jain et al.

(10) Patent No.: US 11,233,865 B2
(45) Date of Patent: Jan. 25, 2022

(54) VISITOR ENGAGEMENT DETECTION AND CONTROL FOR ONLINE SESSIONS WITH A LISTING PLATFORM

(71) Applicant: Adobe Inc., San Jose, CA (US)

(72) Inventors: Ajay Jain, Ghaziabad (IN); Sanjeev Tagra, Panipat (IN); Sachin Soni, New Delhi (IN)

(73) Assignee: Adobe Inc., San Jose, CA (US)

( * ) Notice: Subject to any disclaimer, the term of this patent is extended or adjusted under 35 U.S.C. 154(b) by 29 days.

(21) Appl. No.: 16/246,008

(22) Filed: Jan. 11, 2019

(65) Prior Publication Data

US 2020/0228614 A1    Jul. 16, 2020

(51) Int. Cl.
*H04L 29/08* (2006.01)
*G06F 11/34* (2006.01)
*G06F 16/954* (2019.01)
*H04L 29/06* (2006.01)

(52) U.S. Cl.
CPC .......... *H04L 67/22* (2013.01); *G06F 11/3438* (2013.01); *G06F 16/954* (2019.01); *H04L 65/4015* (2013.01)

(58) Field of Classification Search
None
See application file for complete search history.

(56) References Cited

U.S. PATENT DOCUMENTS

| 8,744,898 B1* | 6/2014 | Hewett | G06Q 30/02 705/7.29 |
| 2007/0244739 A1* | 10/2007 | Soito | G06Q 30/02 705/7.29 |
| 2010/0161540 A1* | 6/2010 | Anisimov | G06F 16/957 706/47 |
| 2011/0208585 A1* | 8/2011 | Daboll | G06Q 10/00 705/14.53 |

(Continued)

OTHER PUBLICATIONS

Tay, Daniel. "10 Ways to Generate More Engagement with Your Social Media Posts", socialmediatoday.com, Jul. 24, 2018 [retrieved on Mar. 16, 2020], Retrieved from the Internet: <URL: https://www.socialmediatoday.com/news/10-ways-to-generate-more-engagement-with-your-social-media-posts/528351/>. (Year: 2018).*

(Continued)

*Primary Examiner* — Kevin T Bates
*Assistant Examiner* — Dae Kim
(74) *Attorney, Agent, or Firm* — FIG. 1 Patents

(57) ABSTRACT

In implementations of a visitor engagement detection and control system for online sessions with a listing platform, a computing device implements a visitor engagement system to monitor user actions by the visitors with items listed by the listing platform, and map the user actions and the items listed by the listing platform to a timeline of the online session. An engagement module determines levels of visitor engagement in the online session based on the mapping of the user actions and the items, and initiates communication with a low-engagement visitor during the online session to (Continued)

increase an engagement level of the low-engagement visitor. In some cases, a communication is then established between the low-engagement visitor and a different low-engagement visitor, an engaged visitor, or an administrator of the listing platform.

20 Claims, 7 Drawing Sheets

(56) References Cited

U.S. PATENT DOCUMENTS

| | | | | |
|---|---|---|---|---|
| 2014/0122622 | A1* | 5/2014 | Castera | H04L 51/04 709/206 |
| 2014/0280294 | A1* | 9/2014 | Stekkelpak | G06F 16/9535 707/769 |
| 2014/0351046 | A1* | 11/2014 | Carlyle | G06Q 30/0255 705/14.53 |
| 2015/0294344 | A1* | 10/2015 | Popomaronis | G06Q 30/0235 705/14.35 |
| 2016/0344828 | A1* | 11/2016 | Hausler | G06F 16/93 |
| 2018/0103004 | A1* | 4/2018 | Demir | H04L 51/16 |
| 2019/0286756 | A1* | 9/2019 | Sweeney | G06F 40/16 |

OTHER PUBLICATIONS

"AI Digital Sales Assistants", Retrieved at: https://smartassistant.com/how-it-works—on Oct. 26, 2018, 12 pages.

Burgess,"Almost Human: AI sales assistants can help you convert more leads in less time", https://www.mpamag.com/poweroriginator/marketing-technology/almost-human-ai-sales-assistants-can-help-you-convert-more-leads-in-less-time-95303.aspx, Mar. 20, 2018, 3 pages.

Eydman,"Smart Chatbots and Virtual Assistants are Coming!", Retrieved at https://chatbotslife.com/smart-chatbots-and-virtual-assistants-are-coming-591638108933—on Oct. 25, 2018, 8 pages.

Lazarevich,"Why digital assistants are so hot right now", https://venturebeat.com/2017/10/31/why-digital-assistants-are-so-hot-right-now/, Oct. 31, 2017, 5 pages.

* cited by examiner

VISITOR ENGAGEMENT DETECTION AND CONTROL FOR ONLINE SESSIONS WITH A LISTING PLATFORM

BACKGROUND

A listing platform may provide items to a large group of people via an online session with the listing platform, such as an online shopping session where visitors can interact with and purchase items listed by the listing platform via a web page. In many cases, multiple different visitors may be "online" at any given time. For instance, a visitor may be considered to be "online" when the visitor has navigated to the listing platform via a computing device, such as by navigating to a web page of the listing platform via a web browser, interacting with the platform via a dedicated application (e.g., an "app"), or accessing the platform in any other way. However, because such sessions are online (e.g., over a network, such as the Internet) visitors in the online session are usually remote from each other and from an administrator (e.g., a seller of an item on the listing platform or an owner of a website of the listing platform) of the online session. Hence, the administrator is not able to observe engagement levels of the visitors in the online session, like the administer would be able to do in a traditional physical store setting where the seller and the potential buyers are collocated. Moreover, such sessions are online, an online session with the listing platform may include large numbers of visitors (e.g., thousands of visitors) who have diverse backgrounds, such as from different cultures, geographies, and time zones, speaking different languages, having various educational backgrounds, and the like. For these reasons, it is not humanly possible to adequately track visitor engagement in an online session with the listing platform, and it can be difficult or impossible to adequately prevent or discourage visitors from dropping out of or disengaging from an online session, such as by closing a web browser or dedicated application of the listing platform or navigating to a different web page. Accordingly, without use of a computer system, the engagement levels of visitors in an online session with the listing platform cannot be accurately determined, along with appropriate corrections that may be used to maintain visitor engagement.

SUMMARY

Techniques and systems are described to determine and facilitate visitor engagement and control in an online session with a listing platform, such as an online shopping session where visitors can interact with and purchase items listed on the listing platform. A computing device, such as a server computing device implemented in a cloud-based system, implements a visitor engagement system that accurately determines engagement levels of visitors at time intervals of an online session with the listing platform, and facilitates visitor engagement, such as by communicating (e.g., in a conversation or a chat message) with low-engagement visitors, as well as forming a communication with the low-engagement visitor and other visitors or a seller of the item.

The visitor engagement system obtains indicators of user actions from user devices of visitors in an online session, such as from a client application running on the user devices at predetermined time intervals. The user actions may include any suitable actions or inputs made by a visitor during the online session, such as selection of an item, placing an item in a digital shopping cart, removing an item from a digital shopping cart, minimizing a user interface that exposes the shopping session, interacting with other materials presented by the listing platform (e.g., reading item reviews, watching videos, and the like), writing an item review, providing an item rating, reading a profile of an item seller or other items listed by the same seller, and the like. Other actions may also be monitored which may be indicative of visitor engagement, including slowing or reducing mouse movement or touch-initiated scrolling and selection, reducing navigation between items, remaining on a website for a long period of time with little engagement or interaction, and so forth.

The visitor engagement system generates a mapping that maps user actions and the items listed by the listing platform to a timeline of the online session, where the mapping is based on the indicators of the user actions and the mapping is generated to indicate the user actions corresponding to the items listed by the listing platform at time intervals of the timeline. At each time interval of the timeline, the visitor engagement system generates an engagement score for each visitor based on the mapping of the user actions and the content, such as by weighting user actions at each time interval, and may rank the visitors based on their respective engagement scores. The visitor engagement system identifies one or more low-engagement visitors from their engagement scores, such as those visitors in a bottom percentage of the ranking (e.g., bottom 15%).

Based on the mapping, the visitor engagement system can initiate communication with the low-engagement visitors during the online session to increase an engagement level of the low-engagement visitor. In some cases, the visitor engagement system selects engaging content determined to increase the engagement level of the low-engagement visitors of the online session, and communicates the engaging content to the low-engagement visitors, such as via a voice conversation with an electronic assistant, a text message in a chat, and the like. In one example, the visitor engagement system determines the engaging content from the mapping by determining the visitors in the online session that correlate with one or more of the visitors having low-engagement, and determines the engaging content from the correlating visitors. Notably, the visitor engagement system can determine and select the engaging content to increase the engagement level of the low-engagement visitors of the online session.

Accordingly, the visitor engagement system accurately determines visitor engagement during an online session based on user actions of the visitors throughout the online session, and quickly detects low-engagement visitors, even for large numbers of remote visitors. The visitor engagement system also facilitates visitor engagement in the online session by actively communicating with the visitors and/or an administrator (e.g., an owner of the listing platform or a seller of an item listed by the listing platform) of the online session, efficiently raising the engagement levels of the low-engagement visitors and discouraging them from disengaging from, or dropping out of, the online session.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
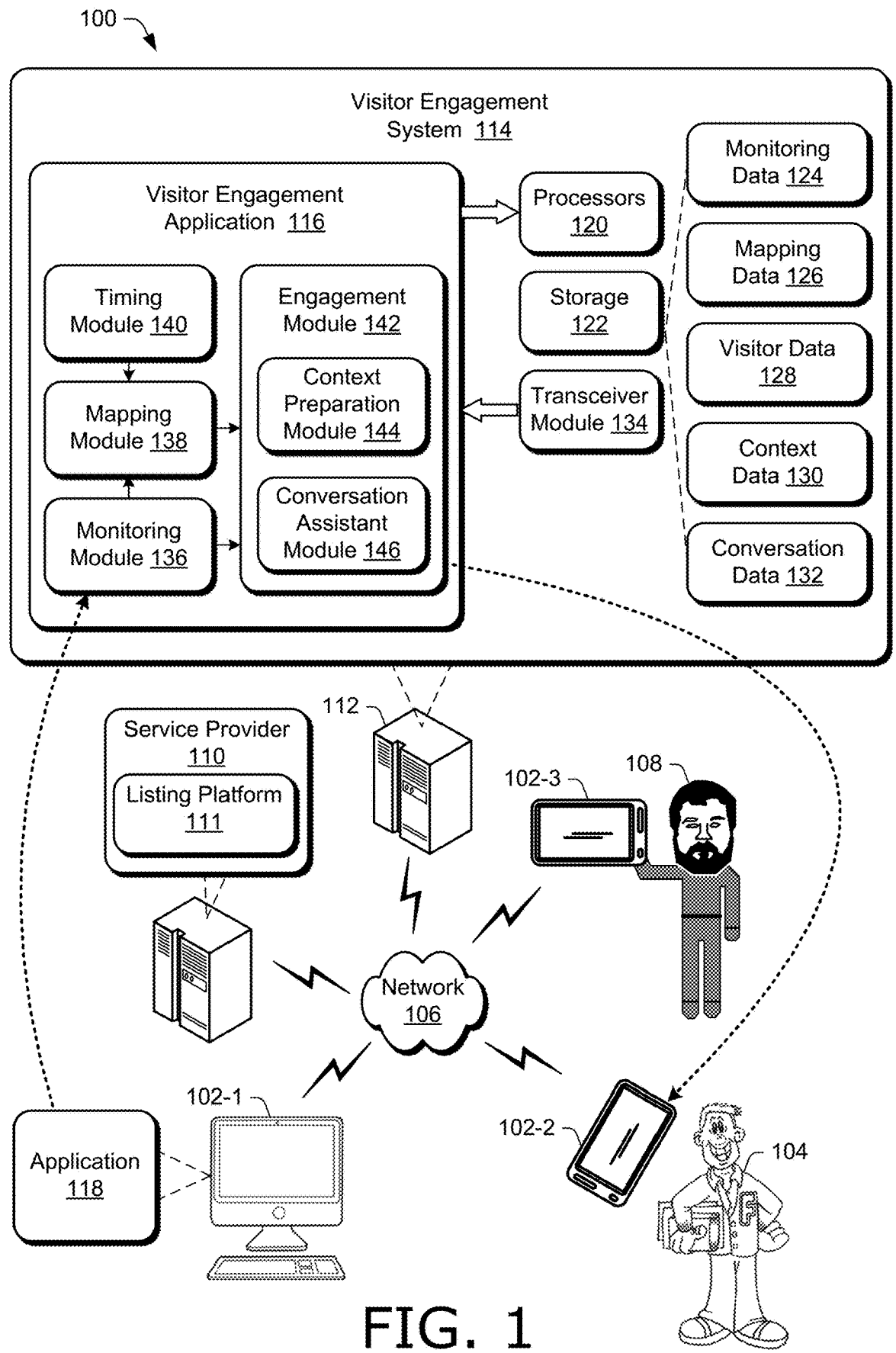
FIG. 1 illustrates a digital medium environment in an example implementation that is operable to employ techniques described herein.

Online sessions with a listing platform, such as online shopping sessions, provide efficient ways for providing items for user interaction and engagement, as well as disseminating materials associated with the items to a large group of people. In an online session, a listing platform may offer items for sale to visitors who "attend" the online session via a user interface displayed on respective user devices. Such items listed for interaction during an online session, may include identifiers of physical items listed for sale by a seller of the listing platform, digital content items (e.g., documents, e-books, videos, audio books), and so forth.

However, the utility of listing items for online interaction is not realized when visitors do not remain engaged in the online session via their respective user devices, such as by slowing or stopping their level of interaction with the listed items or other materials presented by the listing platform. Visitors may disengage from an online session with the listing platform for any suitable reason, such as an inability to determine an answer to a question regarding a particular item listed for sale, a concern about the reliability of an item listed for sale, a concern about the price of an item, and the like. In some cases, visitors may simply forget about an item, such as when a user places an item into a shopping cart and intends to purchase the item, but then becomes distracted by a different task and forgets to complete the transaction. When a visitor is not engaged in the online session with the listing platform, the online session ceases to be efficient and useful for the visitor and also results in lack of interaction with the item, such as when the user fails to select, purchase, or download a listed item. Low-engagement during an online session may also result in low-engagement in subsequent sessions as well as a loss of sellers who provide items for visitor interaction.

For online sessions, visitor engagement systems that rely on manual monitoring with human intervention, as which may be conventionally done in an online store via a salesperson, are not feasible due to the varied remote locations of visitors and the large numbers of visitors possible in an online setting. Hence, a computer system is needed to track visitor engagement in an online setting, such as for an online shopping session. Conventional participation engagement systems, however, such as operated by a service provider hosting an online session, do not accurately and regularly track user actions during the online session in real-time, e.g., as the potential buyer is actively engaged with a website offering the items for selection. Therefore, conventional participation engagement systems are not suitable to adequately prevent or discourage visitors from dropping out of or disengaging from an online session, such as by communicating content determined from user actions obtained throughout the online session and selected to increase a visitor's engagement level.

Accordingly, this disclosure describes systems, devices, and techniques for determining and facilitating visitor engagement in online sessions, such as online shopping sessions. A computing device, such as a server computing device implemented in a cloud-based system, implements a visitor engagement system that obtains indicators from user devices of visitors in an online session (e.g., via navigation to the listing platform). In one example, an application (e.g., a web browser or a dedicated application of the listing platform) is enabled on client devices to enable navigation to the listing platform during the online sessions, and supplies indicators of user actions to the visitor engagement system on the server device. For instance, the application may record indicators of user actions and parameters of the client device during the online session. At predetermined times (e.g., at periodic intervals during the online session), the application of a user device of a visitor in the online session may communicate (e.g., over a network) indicators of user actions and parameters of the user device to the server operating the visitor engagement system. The visitor engagement system determines engagement levels of the visitors based on user actions and takes actions with visitors, an administrator, or both to facilitate visitor engagement, such as when one or more visitors of the online session have engagement levels below a threshold engagement level.

The user actions may include any suitable actions or inputs made by a visitor during the online session, such as selection of an item, placing an item in a digital shopping cart, removing an item from a digital shopping cart, minimizing a user interface that exposes the shopping session, interacting with other materials presented by the listing platform (e.g., reading item reviews, watching videos, and the like), writing an item review, providing an item rating, reading a profile of an item seller or other items listed by the same seller, first time visit or multiple visits to the listing platform, and the like. Other actions may also be monitored which may be indicative of visitor engagement, including slowing or reducing mouse movement or touch-initiated scrolling and selection, reducing navigation between items, remaining on a website for a long period of time with little engagement or interaction, and so forth.

In one example, the visitor engagement system implemented by the server computing device generates a mapping that maps user actions and the items listed by the listing platform to a timeline of an online session, where the mapping indicates the user actions corresponding to the items listed by the listing platform at time intervals of the timeline. The mapping can be based on time intervals of the timeline, such as by including, for each time interval, user actions with respect to various listed items that occurred during the time interval. Based on the mapping, the visitor engagement system determines one or more of the visitors of the online session that may have an engagement level below a threshold engagement level, such as by generating an engagement score for each visitor from the indicators obtained from the user devices, and determining the low-engagement visitors from the engagement scores. The low-engagement visitors, therefore, correspond to visitors of the listing platform who may have a high probability of leaving the listing platform thereby ending the online session. Notably, the engagement scores may be determined in real-time such that the visitors are still in the online session when the engagement scores are determined.

In one example, the visitor engagement system compares engagement scores for each visitor at each time interval to a threshold engagement score to determine the low-engagement visitors having an engagement level in the online session below the threshold engagement level. Additionally or alternatively, the visitor engagement system may rank visitors according to their engagement scores, and a threshold percentage of the visitors can be selected as visitors having an engagement level in the online session below a threshold engagement level (e.g., low-engagement visitors), such as those visitors in the bottom 15% according to their engagement scores.

The visitor engagement system can determine and select engaging content for increasing an engagement level in the online session of the low-engagement visitors in real-time before the visitors terminate the online session. The engaging content, for example, may help visitors of an e-commerce web page improve their understanding of the items listed for sale, or enable engagement with other visitors or a seller of the item in real time. In one example, the visitor engagement system determines content from the mapping of user actions to the timeline of the online session. For instance, based on the mapping, it may be determined that a visitor interacted with an item listed by the listing platform (e.g., by placing the item in a digital shopping cart), but then did not engage further in the online session. Accordingly, the visitor engagement system may determine content related to the particular item, such as detailed information or a video about the listed item, and communicate this content to the visitor (e.g., in a voice conversation or chat message), thereby encouraging the visitor to engage or re-engage in the online session with the listing platform, such as by proceeding to purchase or download the listed item, rather than disengage from, or drop out of, the session.

In one or more implementations, the visitor engagement system may initiate communication with the low-engagement visitor during the online session to increase an engagement level of the low-engagement visitor. The communication, for instance, may pair the low-engagement visitor with a real-life user or a virtual assistant, and initiate a conversation with the low-engagement visitor in real time in a way which is designed to motivate the visitor to increase their engagement, and potentially turn a potential buyer into a buyer of items listed by the listing platform.

Additionally or alternatively, the visitor engagement system may determine visitors in the online session that correlate with low-engagement visitors. In one example, other visitors that do not have a low-engagement in the online session may correlate with one or more of the low-engagement visitors. Hence, the visitor engagement system may pair (e.g., via a conversation or chat message) the low-engagement visitors in the online session with other "engaged" visitors that have higher engagement in the online session, to assist the low-engagement visitors. For instance, a visitor that purchased an item, wrote a review of an item, or provided a high ranking of an item may be considered an "engaged" visitor with respect to the particular item. As such, the engaged visitor may be paired with a low-engagement user (e.g., a visitor that places the item in a shopping cart but then removes the item) to assist the low-engagement visitor. Doing so may enable the engaged visitor to increase the conversion rate of the low-engagement visitor, such as by causing the low-engagement user to select, purchase, or download the item. Additionally or alternatively, the other visitors that correlate with one or more visitors having low-engagement can include visitors also having low-engagement. Hence, the visitor engagement system may pair (e.g., via a conversation or chat) visitors in the online session having low-engagement with other visitors also having low-engagement in the online session.

In one example, the visitor engagement system communicates identifiers of visitors and indicators of content to a seller or administrator of the listing platform. For instance, the identifiers of the low-engagement visitors (e.g., visitors having respective engagement levels below a threshold engagement level) can be communicated to a seller that lists a respective item on the listing platform. The information may also identify that the items, item descriptions, or reviews are not well-understood by the visitors. Accordingly, the seller can adjust the presentation of items or associated materials on the listing platform in real-time, such as by providing more detailed description of an item, lowering the price of an item, adjusting the presentation of the item, and the like, to improve visitor engagement with the listed items and discourage a visitor from terminating the online session, such as by disengaging from, or dropping out of, the online session. Doing so may in effect increase visitor conversion by increasing the number of visitor selections, downloads, or purchases of the listed items.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the described techniques. The illustrated digital medium environment 100 includes computing devices 102, such as a computer 102-1 (e.g., a desktop computer or laptop computer), a smart phone 102-2, and a tablet device 102-3. The computing devices 102 are examples of user devices (e.g., client devices) and are depicted in FIG. 1 as a desktop computer, a tablet device, and a smartphone as the example computing devices. Generally, the computing devices 102 can be any suitable computing device, such as a mobile phone, tablet, laptop computer, desktop computer, gaming device, goggles, glasses, wearable device (e.g., a wristband, watch, or headband), camera, digital assistant, echo device, navigation device, home appliance, copier, scanner, test and measurement equipment, vehicle computing system, and the like. Hence, computing devices 102 may range from a full resource device with substantial memory and processor resources (e.g., personal computers, game consoles) to a low-resource device with limited memory or processing resources (e.g., mobile devices).

Various types of input devices and input instrumentalities can be used to provide input to computing devices 102. For example, computing devices 102 can recognize input as being a mouse input, stylus input, touch input, input provided through a natural user interface, and the like. Thus, computing devices 102 can recognize multiple types of gestures including touch gestures and gestures provided through a natural user interface. In one example, computing devices 102 include speech recognition, identification, and synthesis functionalities, microphones, and speakers that allow computing devices 102 to communicate with a user in a conversation, e.g., a user conversation.

Figure 7:
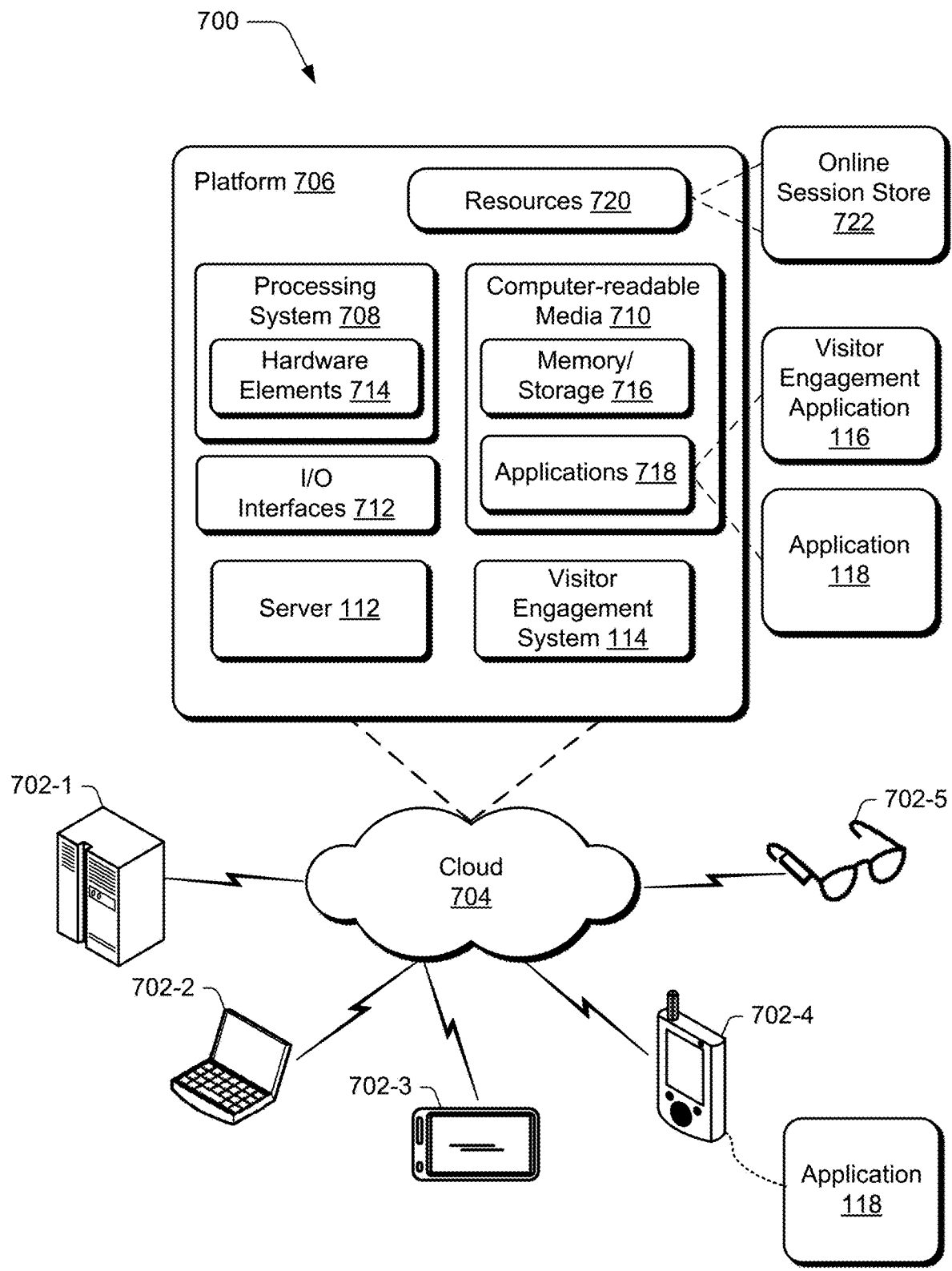
FIG. 7 illustrates an example system including various components of an example device that can be implemented as any type of computing device as described and/or utilized with reference to FIGS. 1-6 to implement aspects of the techniques described herein.

Furthermore, each of computing devices 102 may be representative of one or a plurality of different devices, such as one or more devices connected to a network that perform operations "over the cloud" as further described in relation to FIG. 7. In one example, at least one of computing devices 102 includes a plurality of computing devices communicatively coupled to each other, such as with a low power wireless communication standard (e.g., a Bluetooth® protocol). In the example in FIG. 1, the computing devices 102 denote user devices of visitors to a listing platform during an online session, such as an online shopping session. Hence, visitor 104 is illustrated proximate to computing device 102-2 to indicate that visitor 104 is operating computing device 102-2. For clarity, respective visitors of some computing devices 102 are omitted from FIG. 1.

Visitors (including visitor 104) using the computing devices 102 participate in an online session over network 106 with a listing platform 111. For example, the listing platform 111 may correspond to an e-commerce website that lists items which are available for purchase by the visitors 104 via computing devices 102. The listing platform 111 may correspond to a dedicated website or application associated with a single seller, or a website or application which acts as a platform to enable multiple different sellers to list items, such as Amazon®. In this example, an administrator 108, such as an owner of the listing platform or a seller of items listed by the listing platform, operates computing device 102-3 to provide items for selection, sale, or download via an online session with the listing platform 111. For example, the listed items, as well as information regarding the listed items (such as item descriptions, images, and/or videos, item reviews, and item ratings) in an online session is exposed for visitors via a user interface on the respective computing devices 102. In one example, the listing platform of the online session is hosted by service provider 110. Service provider 110 can be any suitable service provider that hosts the listing platform 111 as a website or application that is accessible over network 106.

Service provider 110 may include one or more servers or service providers that provide services and/or resources to computing devices 102. Generally, resources provided by service provider 110 may be licensed, purchased, or may be made freely available, (e.g., without authentication, license, or account-based access). The resources can include any suitable combination of services and content, such as made available over network 106 by one or more providers. Some examples of services include, but are not limited to, an online shopping service, an online learning-session service, a photo editing service, an image database service, a web development and management service, a collaboration service, a social networking service, a messaging service, an advertisement service, a graphics design service, an image storage service (including storage and access of photos, documents, records, files, and the like), and so forth. Content may include various combinations of assets, including items listed for sale, videos, ads, audio, multi-media streams, animations, images, web documents, web pages, applications, device applications, text documents, drawings, presentations, stock photographs, user profiles, user preferences, user data, and the like.

Network 106 communicatively couples computing devices 102 with each other, service provider 110, and server 112. Network 106 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 112 can include any suitable number of servers, and may be representative of one or a plurality of different devices. Server 112 includes visitor engagement system 114 that includes visitor engagement application 116 (discussed below in more detail) to determine and facilitate visitor engagement in an online session. In one example, visitor engagement system 114 obtains data collected by an application 118 on one or more of computing devices 102. For instance, each of computing devices 102 include an instantiation of the application 118. Application 118 may include any application configured to enable user access to the online service, such as a web browser that enables navigation to a website of the listing platform or a dedicated application or "App" of the listing platform. For clarity, only computing device 102-1 is illustrated in FIG. 1 as including the application 118.

Application 118 is representative of functionality configured to manage data regarding an online session on computing devices 102. In one example, application 118 exposes a user interface on computing devices 102 to facilitate the online session. For instance, application 118 may be provided to computing devices 102 by service provider 110 and configured according to configuration parameters provided by administrator 108, such as parameters that designate to report indicators of user actions at predetermined times during the online session.

Application 118 can record data indicative of any suitable user actions during an online session, such as selection of an item, placing an item in a shopping cart, removing an item from a shopping cart, minimizing a user interface that exposes the shopping session/shopping platform, interacting with other materials presented on by the listing platform (e.g., reading item reviews, watching videos, and the like), writing an item review, providing an item rating, reading a profile of an item seller or other items listed by the same seller, and the like. Other actions may also be monitored which may be indicative of user engagement, including slowing or reducing mouse movement or touch-initiated scrolling and selection, reducing navigation between items, remaining on a website for a long period of time with little engagement or interaction, and so forth. In one example, application 118 communicates indicators of user actions via network 106 to visitor engagement system 114 of server 112 (this communication is illustrated in FIG. 1 with an arrow coupling application 118 to a monitoring module of visitor engagement application 116). Additionally or alternatively, application 118 can include a copy of the visitor engagement application 116.

Visitor engagement system 114 improves visitor engagement in an online session by determining an engagement level of visitors, determining one or more visitors having an engagement level below a threshold engagement level, and forming one or more communications (to visitors, an administrator (e.g., seller), or both) to prevent a visitor from disengaging from, or dropping out of, the online session.

Visitor engagement system 114 includes visitor engagement application 116 (discussed below in more detail). Visitor engagement system 114 also includes processors 120, which can include any suitable number and any suitable type of processor. In one example, visitor engagement system 114 is implemented at least partially by storing instructions on storage 122 and executing the instructions on processors 120 included in visitor engagement system 114. For instance, processors 120 may execute portions of visitor engagement application 116.

Visitor engagement system 114 includes storage 122, which can be any suitable type of storage accessible by or contained in visitor engagement system 114. Storage 122 stores data in memory, and provides access to and from memory included in storage 122 for any suitable type of data. For instance, storage 122 includes monitoring data 124, including data associated with visitors and user devices in an online session, such as indicators of user actions, configuration settings of user devices (e.g., indications of whether a sound device is enabled or disabled on a user device of a visitor), text typed into a chat window during an online session, text removed from a chat window during an online session, quiz questions, poll questions, visitor identification numbers, timestamps of the online session, data identifying a service provider that hosts an online session, visitor data and user device data from previous online sessions (e.g., previous classes of a multi-class course), combinations thereof, and the like.

Storage 122 also includes mapping data 126, including data regarding a mapping of user actions to a timeline of an online session, such as time intervals of the online session, data structures indicating a time interval of the shopping session, content presented during the time interval, a user action during the time interval, and an indicator of an algorithm or software version used to generate the mapping, combinations thereof, and the like.

Storage 122 also includes visitor data 128, including data regarding visitor engagement during an online session, such as engagement scores of visitors, rankings of visitors, such as rankings according to engagement scores, groupings of visitors, such as groupings of visitors having low-, medium-, and high-engagement levels, content for which visitors are determined to have low or high engagement, a time interval of the online session for which visitors are determined to have low or high engagement, thresholds (e.g., threshold engagement levels, threshold scores, percentage thresholds used to determine a group of visitors having low-engagement, etc.), combinations thereof, and the like.

Storage 122 also includes context data 130, including data regarding a visitor of an online session, such as a visitor of an online session having an engagement level below a threshold engagement level, as well as other visitors of the online session that correlate to the visitor session having an engagement level below the threshold engagement level (e.g., visitors also having a low-engagement level, visitors having a high engagement level, visitors having a low-engagement level for common content, etc.), content based on visitors that correlate to a visitor having an engagement level below a threshold engagement level (e.g., content from a chat, question, poll, or quiz), content determined to increase an engagement level of a visitor in an online session, combinations thereof, and the like.

Storage 122 also includes conversation data 132, including data regarding a communication with a visitor or an administrator (e.g., a seller) in an online session or a service provider hosting the online session, such as chat, spoken conversation, telephone call, text message, etc., including a transcript of a communication, a recording of a communication, a translation of a communication from a first language to a second language, a duration of a communication, a number of characters in a communication, user preferences indicating a type of communication preferred by a visitor, such as a chat, text, or phone call, a phone number, computer number, or identification number for a visitor that can be used to communicate with the visitor, a number and identification of visitors in a communication, an indicator of whether an administrator is included in the communication, combinations thereof, and the like.

Visitor engagement system 114 also includes transceiver module 134, which is representative of functionality configured to transmit and receive data using any suitable type and number of communication protocols. For instance, data within visitor engagement system 114 may be transmitted to one of computing devices 102 with transceiver module 134 over network 106. Furthermore, data can be received from one of computing devices 102 with transceiver module 134. In one example, transceiver module 134 communicates packetized data.

Visitor engagement system 114 includes visitor engagement application 116. Visitor engagement application 116 includes monitoring module 136, mapping module 138, timing module 140, and engagement module 142, which also includes context preparation module 144, and conversation assistant module 146. These modules work in conjunction with each other to determine and facilitate visitor engagement in an online session. Although generally shown and described as separate modules of the visitor engagement application, any one or combination of the modules may be implemented together as a multi-function module, or independently as components of the visitor engagement application.

Monitoring module 136 is representative of functionality configured to obtain any suitable data regarding visitor engagement in an online session. Monitoring module 136 can obtain data for an online session from any suitable source in any suitable way. In one example, monitoring module 136 obtains respective indicators from a plurality of user devices indicating respective user actions during an online session. For instance, application 118 on computing devices 102 may record on computing devices 102 data indicative of user actions, device configurations, combinations thereof, and the like, and monitoring module 136 may obtain respective indicators of user actions from computing devices 102. In one example, monitoring module 136 obtains respective indicators of user actions from computing devices 102 based on a timeline of an online session.

In one example, monitoring module 136 obtains data regarding visitor engagement in an online session from a service provider, such as service provider 110 that hosts an online session, such as an online shopping session. For instance, application 118 of computing devices 102 may communicate data regarding visitor engagement in an online session, such as indicators of user actions, user device configuration settings, and the like to service provider 110, and monitoring module 136 may obtain data regarding visitor engagement in the online session from service provider 110.

Monitoring module 136 can obtain data including indicators of any suitable user actions during an online session, such as selection of an item, placing an item in a digital shopping cart, removing an item from a digital shopping cart, minimizing a user interface that exposes the shopping session, interacting with other materials presented by the listing platform (e.g., reading item reviews, watching videos, and the like), writing an item review, providing an item rating, reading a profile of an item seller or other items listed by the same seller, and the like. Other actions may also be monitored which may be indicative of visitor engagement, including slowing or reducing mouse movement or touch-initiated scrolling and selection, reducing navigation between items, remaining on a website for a long period of time with little engagement or interaction, and so forth.

Data regarding an online session obtained by monitoring module 136, along with any suitable information, such as indicators of user actions, indicators of device configurations, timestamps corresponding to indicators, content presented during an online session at timestamps corresponding to indicators, text of chats, audio recordings of user questions and answers, text transcriptions of user questions and answers, data structures indicating a time interval of an online session, content presented during the time interval, and a user action during the time interval, combinations thereof, and the like, used by or calculated by monitoring module 136 are stored in monitoring data 124 of storage 122 and made available to modules of visitor engagement application 116. In one example, monitoring module 136 provides indicators of user actions to mapping module 138.

Mapping module 138 is representative of functionality configured to map user actions and content to a timeline of an online session to produce a mapping. Mapping module 138 can generate a mapping in any suitable way. In one example, mapping module 138 receives indicators of user actions from monitoring module 136 and a timeline from timing module 140, and generates a mapping from the user actions and the timeline. Additionally or alternatively, mapping module 138 can receive data structures indicating a time (e.g., a time interval) of an online session and a user action during the time interval from monitoring module 136, and a timeline from timing module 140. Mapping module 138 can generate a mapping from the user actions and the timeline by assigning the time intervals from monitoring module 136 to the timeline from timing module 140. For instance, mapping module 138 may receive a data structure from monitoring module 136 indicating that a visitor performed an action at a time interval indicated by designator "Tx", and assign the action to a time on a timeline provided by timing module 140 corresponding to a time interval designated by Tx, such as from a nine-minute timestamp to a twelve-minute timestamp for a three minute time interval.

In one example, application 118 records indicators of user actions and device settings during an online session together with an indicator of time, such as a timestamp, time interval, and the like. Indicators of user actions and device settings are obtained by monitoring module 136 and provided to mapping module 138. Hence, mapping module 138 can map the user actions and device settings to a timeline provided from timing module 140 using the indicators of time recorded with the indicators of user actions and device settings by application 118 to produce a mapping that indicates user actions at time intervals of the timeline.

Figure 2:
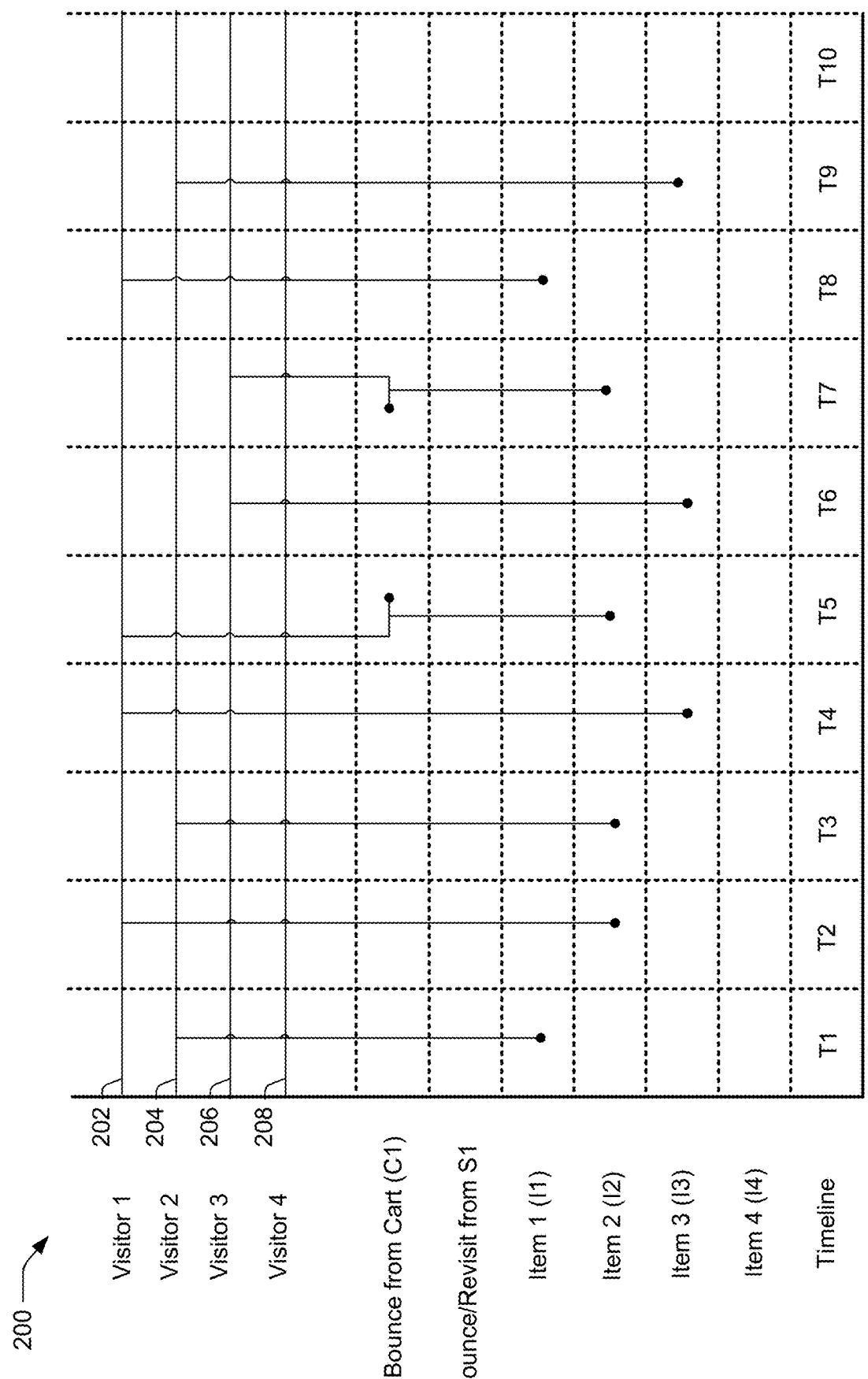
FIG. 2 illustrates an example mapping of user actions and online-session content to a timeline of the online session in accordance with one or more aspects of the disclosure.

Mapping module 138 can map any suitable data regarding an online session, such as user actions, content, user device configurations, and the like to a timeline of the online session. Furthermore, mapping module 138 can map data regarding any suitable number of visitors and administrators to a timeline of an online session. An example mapping of user actions and online-session content (e.g., shopping-session content) to a timeline of the online session in accordance with one or more aspects of the disclosure and generated by mapping module 138 is illustrated in FIG. 2. FIG. 2 includes example mapping 200 for four visitors (Visitor 1, Visitor 2, Visitor 3, and Visitor 4) to a listing platform during an online session (e.g., an online shopping session via an e-commerce website) that is broken into ten time intervals T1, T2, . . . T10. For instance, for a one hour-long online shopping session, each time interval may span six minutes of the online session. Mapping 200 also includes user interactions, which in this example includes a bounce from a digital shopping cart, a shopping cart bounce revisit from a sellable item, and four items listed by the listing platform (Item 1, Item 2, Item 3, and Item 4). Each of the four listed items, for example, may include a listing for an item offered for sale via the listing platform, including listings for physical goods, digital goods, services, and the like.

Mapping 200 maps user actions for the four visitors (Visitor 1, Visitor 2, Visitor 3, and Visitor 4) to time intervals T1, T2, . . . T10 of the online session. User actions for Visitor 1 are denoted by designator 202, user actions for Visitor 2 are denoted by designator 204, user actions for Visitor 3 are denoted by designator 206, and user actions for Visitor 4 are denoted by designator 208.

In the example in FIG. 2, designator 202 denotes that Visitor 1 visited item 2 in time interval T2, visited item 3 in time interval T4, visited item 2 (again) in time interval T5 and placed item 2 in a digital shopping cart but then removed the item from the cart, and visited item S1 in time interval T8. As described herein, a "visit" to an item corresponds to navigating to a listing page of the item via a web browser or a dedicated application. Similarly, designator 204 denotes that Visitor 2 visited item 1 in time interval T1, visited item 2 in time interval T3, and visited item 3 in time interval T9. Similarly, designator 206 denotes that Visitor 3 visited item 3 in time interval T6 and placed item 2 in the digital shopping cart at time interval T7 but then removed item 2 from the cart. Notably, this mapping may be performed for any number of visitors. In this example, as Visitor 1 and Visitor 3 each placed items into the cart but then removed them from the cart, both Visitor 1 and Visitor 3 may be identified as a low-engagement visitors that are at risk of ending the online shopping session.

Returning to FIG. 1, a mapping generated by mapping module 138, along with any suitable information, such as visitor identifiers, data structures for visitors, such as data structure indicating a time interval of an online session, content presented during the time interval, and a user action during the time interval, chat topics, presentation content (e.g., slides and audio), mappings of previous online sessions (e.g., previous classes in a multi-class learning session), combinations thereof, and the like, used by or calculated by mapping module 138 are stored in mapping data 126 of storage 122 and made available to modules of visitor engagement application 116. In one example, mapping module 138 provides a mapping of user actions to a timeline of an online session to engagement module 142 and context preparation module 144.

Timing module 140 is representative of functionality configured to generate and manage a timeline of an online session. In one example, timing module 140 generates a timeline of an online session by assigning time intervals to a duration of an online session, such as equally-spaced time intervals T1, T2, . . . T10 in FIG. 2. Additionally or alternatively, time intervals of a timeline can be user configured. For instance, an administrator of a listing platform can provide configuration parameters to timing module 140 to indicate a number of time intervals for an online session, such as ten to indicate to break up an online session into ten equally-spaced time intervals. Additionally or alternatively, the administrator may provide a duration of time intervals to timing module 140 to configure a timeline, such as a parameter designating six minutes, so that a one-hour online session has a timeline including ten equally-spaced six minute time intervals.

In one example, timing module 140 generates timestamps from a counter (e.g., a clock) during an online session. A timestamp can be any suitable indicator of a clock or counter, such as a number, a word, a position (e.g., a position of an address in a memory, a digitization of a position of an analog clock arm, etc.), combinations thereof, and the like. Timestamps generated by timing module 140 can be included in a timeline generated by timing module 140. For instance, a timeline generated by timing module 140 may include time intervals, timestamps, combinations thereof, and the like.

Additionally or alternatively, a timeline generated by timing module 140 may be communicated to application 118 of computing devices 102. In one example, timing module 140 communicates an indication of time intervals, such as a list of time intervals, a number of equally-spaced time intervals (e.g., ten), combinations thereof, and the like, to application 118. Application 118 can generate any suitable clock based on a timeline, time intervals, or any other timing information from timing module 140. Hence, application 118 may record user actions and device settings during an online session together with an indicator of time, such as a timestamp (e.g., "9:03" to designate nine minutes and three seconds from the start of an online session), a time interval (e.g., "T3" to designate a third time interval in a sequence of time intervals that span an online session), and the like.

A timeline generated by timing module 140, along with any suitable information, such as timestamps, time intervals, configuration parameters (e.g., presenter-specified parameters to set a number of time intervals that span an online session), durations (e.g., durations of time intervals, current or previous online sessions, etc.), combinations thereof, and the like, used by or calculated by timing module 140 are stored in storage 122 and made available to modules of visitor engagement application 116. In one example, timing module 140 provides a timeline of an online session to mapping module 138.

Engagement module 142 is representative of functionality configured to determine one or more visitors in an online session having an engagement level in the online session below a threshold engagement level. Engagement module 142 can determine one or more visitors having an engagement level below a threshold engagement level in any suitable way. In one example, engagement module 142 receives a mapping from mapping module 138, and determines one or more visitors having an engagement level in an online session below a threshold engagement level based on the mapping received from mapping module 138. Additionally or alternatively, engagement module 142 receives indicators of user actions from monitoring module 136, and determines one or more visitors having an engagement level in an online session below a threshold engagement level based on the indicators of user actions received from monitoring module 136.

In one example, engagement module 142 determines a respective engagement score for each visitor in an online session. For instance, indicators of user actions obtained by monitoring module 136 for each visitor are each assigned a respective weight by engagement module 142. An engagement score for a visitor can be determined from the respective weights for the visitor, such as by summing the respective weights, averaging the respective weights, forming a weighted combination of values assigned to user actions, and the like.

Engagement module 142 can generate engagement scores for visitors at any suitable rate. In on example, engagement module 142 determines a new engagement score for each visitor at predetermined time intervals of an online session, such as at T1, T2, . . . T10 in FIG. 2. An engagement score generated by engagement module 142 can be based on any suitable time period. For instance, engagement module 142 may compute an engagement score at a current time interval, TN, using weights for visitors from the current time interval and weights for visitors from previous time intervals, TM (M<N).

In one example, engagement module 142 ranks visitors based on their respective engagement scores, and determines one or more visitors having an engagement level below a threshold engagement level based on the ranking. For instance, engagement module 142 may assign a percentage of the visitors based on the ranking, such as the bottom 10%, as one or more visitors having an engagement level below a threshold engagement level (e.g., low-engagement visitors).

Additionally or alternatively, engagement module 142 may form a plurality of groups of visitors based on a ranking of the visitors according to their respective engagement scores. For instance, engagement module 142 may form three groups of visitors. A first group includes high-scoring visitors, such as visitors having respective engagement scores above a first threshold score, or visitors in a highest-scoring percentile (e.g., top 10%). A third group includes low-scoring visitors, such as visitors having respective engagement scores below a second threshold score, or visitors in a lowest-scoring percentile (e.g., bottom 10%). A second group includes mid-scoring visitors, such as visitors not included in the first group or the third group. Engagement module 142 may determine visitors in the third group as one or more visitors having an engagement level below a threshold engagement level. In one example, engagement module 142 assigns visitors having respective engagement scores below a threshold engagement score, such as 50%, as one or more low-engagement visitors having an engagement level below a threshold engagement level.

Additionally or alternatively, engagement module 142 may assign priorities to low-engagement visitors having an engagement level below a threshold engagement level. For instance, those visitors that are determined to have an engagement level below a threshold engagement level and also satisfy a disengagement criteria may be indicated as high priority so that conversation assistant module 146 can communicate to them without delay (e.g., before other visitors) in an attempt to prevent them from disengaging from the online session. A disengagement criteria can be any suitable criteria, such as having an engagement score less than a threshold engagement score for one or more time intervals, e.g., for three consecutive time intervals of an online session, having engagement scores decline at a rate greater than a threshold decline rate, combinations thereof, and the like.

An indication of one or more visitors having an engagement level below a threshold engagement level determined by engagement module 142, along with any suitable information, such as visitor identities (e.g., names, identification numbers, etc.), engagement scores, statistics of engagement scores (e.g., mean, standard deviation, maximum, minimum, etc.) rankings of visitors, thresholds used to determine visitors having an engagement level below a threshold engagement level, an indication of a disengagement criteria used to prioritize visitors, indications of priority, combinations thereof, and the like, used by or calculated by engagement module 142 are stored in storage 122 and made available to modules of visitor engagement application 116. In one example, engagement module 142 provides a list of low-engagement visitors to context preparation module 144.

Context preparation module 144 is representative of functionality of the engagement module 142 configured to determine content, visitors, or content and visitors to increase an engagement level of a visitor in an online session. Context preparation module 144 can determine content, visitors, or content and visitors to increase an engagement level of a visitor in an online session in any suitable way. In one example, context preparation module 144 determines visitors of an online session that correlate to one or more visitors having an engagement level below a threshold engagement level determined by engagement module 142. For instance, context preparation module 144 may determine correlating visitors based on a mapping provided by mapping module 138. Context preparation module 144 can determine content for increasing an engagement level of one or more low-engagement visitors having an engagement level below a threshold engagement level based on the correlating visitors.

Additionally or alternatively, context preparation module 144 can determine content, visitors, or content and visitors to increase an engagement level of a visitor in an online session based on data structures that include indicators of user actions during the online session, such as data structures obtained by monitoring module 136 and used to generate a mapping by mapping module 138. For instance, indicators of user actions can be packaged in respective data structures for respective visitors of an online session, such as by application 118, monitoring module 136, or mapping module 138. Each data structure can indicate suitable data regarding a user action and the online session, such as a time interval of the online session, content presented during the time interval, and a user action during the time interval.

In one example, a data structure for a visitor (e.g., a potential buyer) is of the form:

```
Sruct VisitorName
{
    Item (S1, S2, ...Sn)
    Time (T1, T2,...Tn)
    Interaction (C1, C2,...Cn)
}
```

Accordingly, context preparation module 144 can determine content, visitors, or content and visitors to increase an engagement level of a visitor of the listing platform in an online session by comparing and correlating contents of data structures for different visitors. As an example, refer again to mapping 200 illustrated in FIG. 2. For the four visitors (Visitor1, Visitor2, Visitor3, and Visitor4) in the example in FIG. 2, example data structures may include:

| Visitor1 | {T2: I2} |
| | {T4: I3} |
| | {T5: I2: C1} |
| | {T8: I1} |
| Visitor2 | {T1: I1} |
| | {T3: I2} |
| | {T9: I3} |
| Visitor3 | {T6: I2} |
| | {T7: I2: C1} |

Based on Visitor 1's lack of engagement, as denoted by Visitor 1's data structure, engagement module 142 determines Visitor 1 to be a visitor having an engagement level below a threshold engagement level based and likely to disengage from the online session. Using the above data structures, context preparation module 144 finds visitors that correlate with Visitor 1, such as by correlating contents of the data structures with the contents of the data structure of Visitor 1. For instance, Visitor 1's data structure above indicates that Visitor 1 visited item 2 in time interval T2, visited item 3 in time interval T4, visited item 2 (again) in time interval T5 and placed item 2 in the cart but then removed the item from the cart, and visited item 1 in time interval T8, and shows no more interactions after time interval T8. Accordingly, context preparation module 144 may correlate data structures of other visitors with Visitor 1's data structure and determine that Visitor 3 also placed item 2 in the cart but then removed item 2 from the cart. Hence, context preparation module 144 may determine that Visitor 3 correlates to Visitor 1. Similarly, context preparation module 144 may correlate data structures of other visitors with Visitor 1's data structure and determine that Visitor 2 also visited item 3. Hence, context preparation module 144 may determine that Visitor 2 also correlates to Visitor 1.

Additionally or alternatively, context preparation module 144 may determine content for increasing Visitor 1's engagement level based on visitors that correlate with Visitor 1, such as Visitor 2 and Visitor 3. Context preparation module 144 may determine content for increasing Visitor 1's engagement level based on Visitor 2 and Visitor 3 in any suitable way, such as an action performed by one or both of Visitor 2 and Visitor 3. Context preparation module 144 can determine any suitable content from any suitable source for increasing a visitor's engagement level. In one example, context preparation module 144 determines content for increasing a visitor's engagement level from a previous online session.

Context preparation module 144 may determine any suitable correlating visitor with the above data structures. In one example, context preparation module 144 determines a group of visitors who each have low-engagement, or appear likely to end an online shopping session (e.g., removing an item from the cart), so that conversation assistant module 146 may open a communication between the group of visitors, such as via a chat. Additionally or alternatively, context preparation module 144 may determine a visitor who has high engagement and a good understanding of an item listed on the listing platform (e.g., a previous buyer of the item and/or an author of a positive review or rating of the item), so that conversation assistant module 146 may open a communication between one or more visitors with low-engagement and a visitor who has high engagement.

Returning again to FIG. 1, indications of content, visitors, or a seller of an item determined to increase an engagement level of a visitor in an online session by context preparation module 144, along with any suitable information, such as visitor identities (e.g., names, identification numbers, etc.), engagement scores, indications of whether visitors are likely to disengage from an online session, indications of whether visitors are highly engaged and likely to assist a visitor who is likely to disengage from an online session, content of previous shopping sessions, sources of content, combinations thereof, and the like, used by or calculated by context preparation module 144 are stored in context data 130 of storage 122 and made available to modules of visitor engagement application 116. In one example, context preparation module 144 provides indications of content, visitors, and sellers determined to increase an engagement level of a visitor in an online session to conversation assistant module 146.

Conversation assistant module 146 is representative of functionality of the engagement module 142 configured to communicate with a visitor or seller of an item. In one example, conversation assistant module 146 communicates content determined by context preparation module 144 to a visitor identified by engagement module 142 that is likely to disengage from the online session, such as by having an engagement level below a threshold engagement level.

Conversation assistant module 146 can communicate with a visitor or a seller in any suitable way, such as with a chat (e.g., a text chat), a phone call (e.g., a voice call), a text message (e.g., a message sent to a mobile phone of a visitor (e.g., a potential buyer of an item) or seller of the item), combinations thereof, and the like. Accordingly, conversation assistant module 146 includes an intelligent assistant that can participate in a voice conversation, text conversation, and the like. In one example, conversation assistant module 146 includes a video virtual assistant (e.g., an animated image of a person) who can communicate in a video conference with a visitor of an online leaning session.

Conversation assistant module 146 can form a communication with any suitable number of people. In one example, conversation assistant module 146 communicates simultaneously with a plurality of visitor of an online session in a group communication (e.g., a conference call). Additionally or alternatively, conversation assistant module 146 may simultaneously form multiple communications with multiple respective visitors.

In one example, conversation assistant module 146 opens a communication channel to a seller of an item listed by the listing platform, such as a voice message to the seller that is consumable by the seller via an earpiece, a chat message to a private chat window of the seller not viewable to visitors of the online session, and the like. For instance, conversation assistant module 146 may communicate to a seller a list of visitors having engagement levels below a threshold engagement level, a number of visitors having engagement levels below a threshold engagement level, an indication that items, item descriptions, or reviews are not well-understood by the visitors, combinations thereof, and the like.

In one example, conversation assistant module 146 opens a communication channel with a first visitor and queries the first visitor regarding their willingness to discuss an item with a second visitor. For instance, the first visitor may have a low-engagement level (such as by removing an item from a cart) and the second visitor may have previously purchased the item. Hence, conversation assistant module 146 may pair the first visitor with the second visitor in a chat, voice call, etc., to increase an engagement level of the first visitor in the online shopping session.

Figure 3:
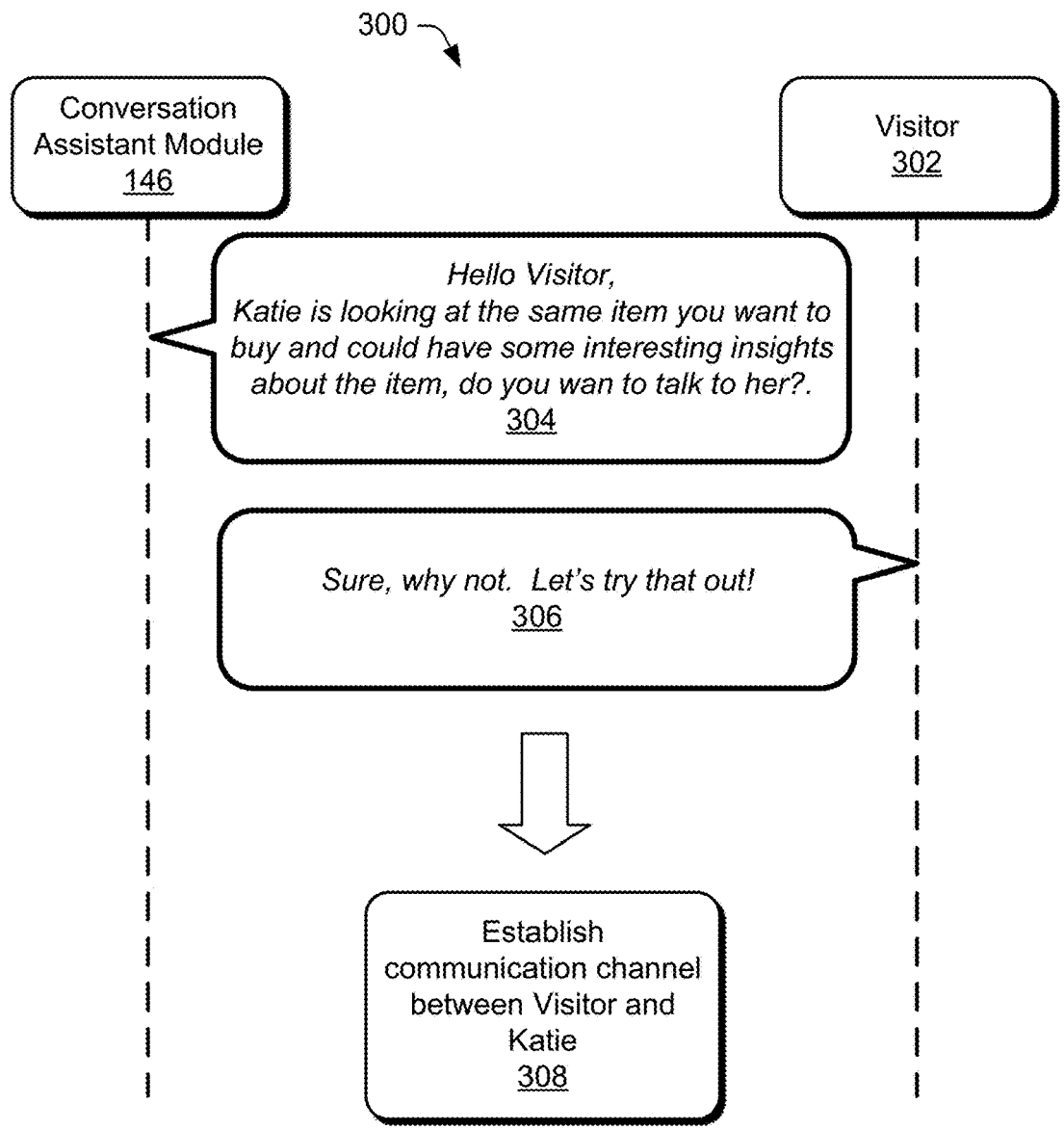
FIG. 3 illustrates an example communication in accordance with one or more aspects of the disclosure.

An example of a communication between conversation assistant module 146 and a visitor of an online session is illustrated in FIG. 3. FIG. 3 illustrates an example communication 300 in accordance with one or more aspects of the disclosure. Communication 300 is an example of a communication between conversation assistant module 146 and visitor 302. Visitor 302 is an example of a visitor determined to have an engagement level below a threshold engagement level by visitor engagement system 114, such as visitor 1 in FIG. 3.

Communication 300 may be any suitable type of communication, such as a voice conversation, a chat, or a combination thereof. At prompt 304, conversation assistant module 146 prompts the visitor. For instance, visitor engagement system 114 may recognize that visitor 302 is not actively interacting with items provided by the listing platform during the online shopping session (e.g., visitor 302 may have placed an item in the shopping cart and then removed the item from the shopping cart). Responsive to recognizing that visitor 302 is not actively shopping during the online shopping session, and that visitor 302 has an engagement level below a threshold engagement level, conversation assistant module 146 asks visitor 302 at prompt 304, "Hello Visitor, Katie is looking at the same item you want to buy and could have some interesting insights about the item, do you want to talk to her?" In this case, Katie may correspond to another visitor with a high engagement with the respective item, such as by previously purchasing the item, writing a review about the item, rating the item, and so forth. Alternately, Katie may correspond to another visitor which correlates to visitor 302 based on having low-engagement with regards to a particular item listed by the listing platform.

At 306, visitor 302 replies with "Sure, why not. Let's try that out!", indicating that visitor 302 is interested in having a conversation with Katie. In response, at 308, the conversation assistant module 146 establishes a communication channel between visitor 302 and Katie, such as by enabling visitor 302 and Katie to have a conversation via a voice conversation, chat, or a combination thereof.

Figure 4:
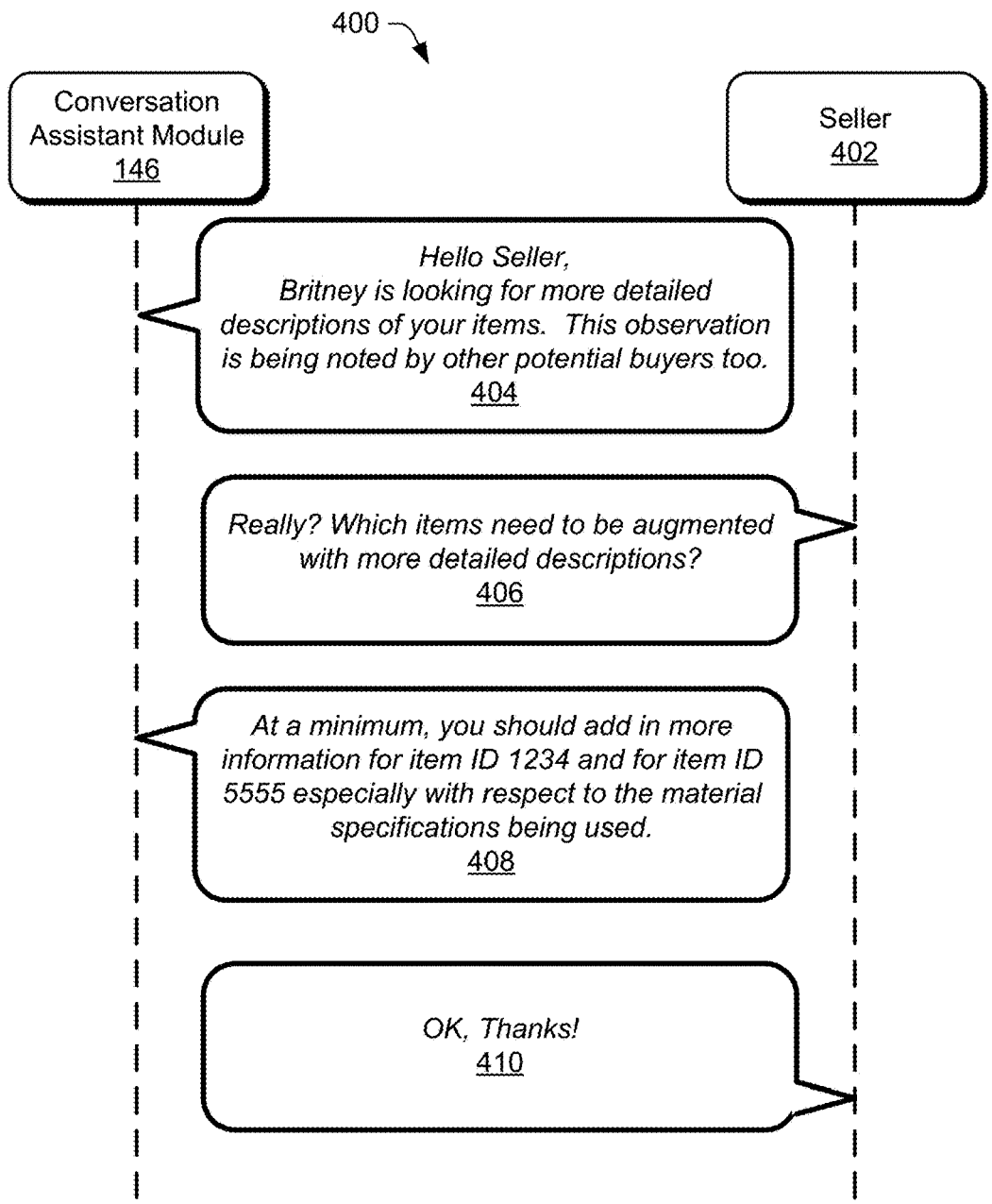
FIG. 4 illustrates an example communication between conversation assistant module and a seller of an item.

An example of a communication between conversation assistant module 146 and a seller of an item is illustrated in FIG. 4. FIG. 4 illustrates an example communication 400 in accordance with one or more aspects of the disclosure. Communication 400 is an example of a communication between conversation assistant module 146 and seller 402. Seller 402 is an example of a seller of an item that is listed by the listing platform.

Communication 400 may be any suitable type of communication, such as a voice conversation, a chat, or a combination thereof. At prompt 404, conversation assistant module 146 prompts the seller. For instance, visitor engagement system 114 may recognize that a visitor named Rebecca is looking for a more detailed description of an item listed for sale on the seller's listing platform (e.g., website). In response, conversation assistant module 146 asks seller 402 at prompt 404, "Hello Seller, Britney is looking for a more detailed descriptions of your items. This observation is being noted by other potential buyers too". Seller 402 replies at 406, "Really? Which items need to be augmented with more detailed descriptions?" Responsive to the seller 402's response, conversation assistant module 146 replies at 408, "At a minimum, you should add in more information for item ID 1234 and for item ID 5555 especially with respect to the material specifications being used". Seller 402 then responds with "OK, Thanks!" at 410. The seller can then add further detail to the identified items on the seller's website to improve visitor engagement level.

Returning again to FIG. 1, a communication generated by conversation assistant module 146, along with any suitable information, such as visitor identities (e.g., names, identification numbers, etc.), content of a communication (e.g., a recording of conversation, a transcript of a conversation, text of a chat, etc.), user preferences regarding for a medium of communication, such as chat, text, phone, etc., engagement scores of visitors in a communication, an indication of whether a seller participated in a communication, combinations thereof, and the like, used by or calculated by conversation assistant module 146 are stored in conversation data 132 of storage 122 and made available to modules of visitor engagement application 116. In one example, conversation assistant module 146 communicates content determined to increase an engagement level of a visitor in an online session to the visitor. Additionally or alternatively, conversation assistant module 146 may communicate an indication of a group of visitors and an indication of online shopping session content to a seller. For instance, a group of visitors may include visitors in the online shopping session having respective engagement levels below a threshold engagement level for at least one time interval, and the online shopping session content may include items that the group of visitors have viewed or selected without purchasing.

Having considered an example digital medium environment, example mapping, and example communication, consider now a discussion of an example system usable to determine and facilitate visitor engagement and control in an online session with a listing platform in accordance with one or more aspects of the disclosure.

Example Visitor Engagement System

Figure 5:
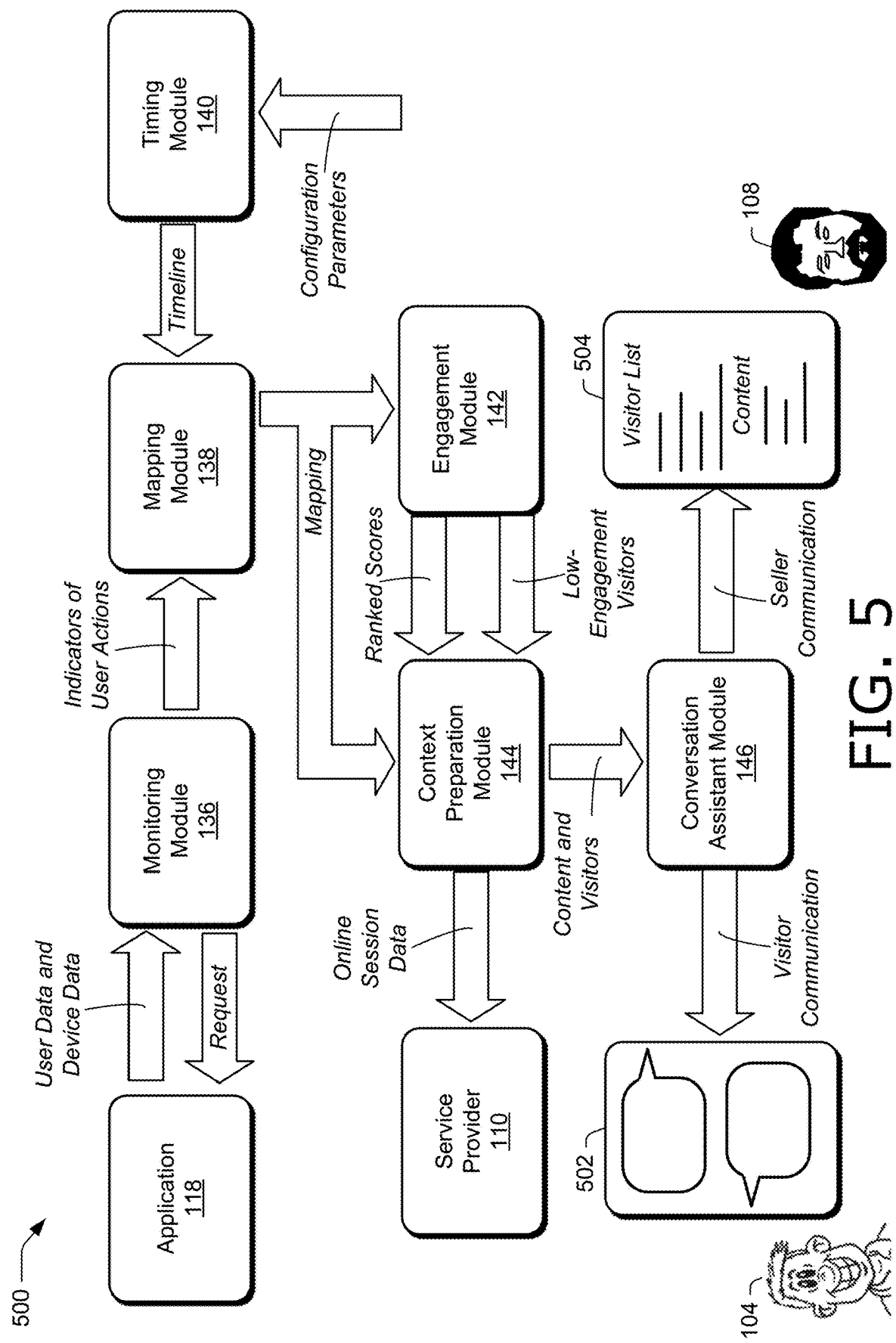
FIG. 5 illustrates an example system usable to determine and facilitate visitor engagement and control in an online session with a listing platform in accordance with one or more aspects of the disclosure.

FIG. 5 illustrates an example system 500 usable to determine and facilitate visitor engagement and control in an online session with a listing platform in accordance with one or more aspects of the disclosure. In this implementation, system 500 includes the modules of visitor engagement application 116 as described in FIG. 1, e.g., monitoring module 136, mapping module 138, timing module 140, engagement module 142, context preparation module 144, and conversation assistant module 146. System 500 is one example of a visitor engagement system that can be constructed using the modules of visitor engagement application 116. For instance, signals can be redefined, and modules can be modified, combined, divided, added, or removed to form a modified system, without altering the functionality of system 400. Accordingly, such modified systems are considered to be within the scope of the disclosure.

Furthermore, for simplicity discussion of system 500 is generally limited to the modules of visitor engagement application 116 and application 118, with a description of some of their interconnects. System 500 can, however, include any suitable signals and communications between modules omitted for simplicity. Such signals may include system clocks, counters, data flags, sequence indicators, reset signals, iteration numbers, timestamps, and the like. In one example, system 500 can operate in real time (e.g., with no perceptible delay to a client). Accordingly, signals can be calculated by the modules of system 500 and communicated between the modules of system 500 without significant delay, so that a communication can be initiated with a visitor without perceptible delay to the visitor (e.g., visitor 104) once the visitor is determined as a low-engagement visitor having an engagement level below a threshold engagement level.

Moreover, system 500 can be implemented on any suitable device or devices. In one example, system 500 is implemented on one computing device (e.g., server 112 or one of computing devices 102 in FIG. 1). In another example, system 500 is implemented on more than one computing device. For instance, parts of system 500 can be implemented by a first computing device, such as computing device 102-1 in FIG. 1, and other parts of system 500 can be implemented by an additional computing device or devices, such as computing device 102-2. In one example, a server implements at least part of system 500, such as server 112 in FIG. 1. A server can be remote, e.g., because it is not collocated with a first computing device. A server may be configured to receive signals of system 500 from a computing device (e.g., from application 118 of one or more of computing devices 102), process the received signals, and transmit results of the processing back to the computing device (e.g., by forming a communication with a visitor operating the computing device). Hence, visitor engagement system 114 of server 112 in FIG. 1 may include system 500. Additionally or alternatively, system 500 may include a copy of application 118.

Monitoring module 136 obtains data regarding an online session, including user data and device data (e.g., indicators of user actions). Monitoring module 136 can obtain data regarding an online session in any suitable way. In one example, monitoring module 136 sends a request to application 118 (e.g., on one of computing devices 102) to obtain data regarding an online session, and application 118 may provide data regarding an online session to monitoring module 136 responsive to receiving the request. Additionally or alternatively, monitoring module 136 may obtain data regarding an online session without sending an explicit request for the data regarding an online session. For instance, application 118 may provide data regarding an online session from one of computing devices 102 to monitoring module 136 at predefined times, such as periodically, at the end of a time interval of an online session (e.g., time intervals configured by a presenter of the online session), combinations thereof, and the like. Monitoring module 136 provides indicators of user actions included in data regarding an online session to mapping module 138.

Mapping module 138 receives indicators of user actions from monitoring module 136 and a timeline of an online session from timing module 140. Timing module 140 may provide any suitable timeline, such as time intervals configured according to configuration parameters. Mapping module 138 generates a mapping of indicators of user actions received from monitoring module 136 to a timeline received from timing module 140. Mapping 200 in FIG. 2 is an example of a mapping generated by mapping module 138.

Mapping 200 can generate a mapping in any suitable way. In one example, mapping 200 generates a mapping by assigning user actions at timestamps indicated by indicators of user actions from monitoring module 136 to time intervals of a timeline provided by timing module 140. For instance, timestamps of a user action from monitoring module 136 may indicate that the user action occurred from time 08:32 to time 11:02 of an online session, and mapping module 138 may map the times from 08:32 to 11:02 to an interval of a timeline, such as T3. Hence, mapping module 138 may assign the user action to time interval T3 in a mapping.

Mapping module 138 provides a mapping to engagement module 142 and context preparation module 144. Engagement module 142 determines one or more visitors in an online session having an engagement level in the online session below a threshold engagement level. Engagement module 142 can determine visitors having an engagement level below a threshold engagement level in any suitable way.

In one example, engagement module 142 assigns an engagement score to each visitor in an online session, and updates the engagement scores throughout the online session. Engagement module 142 may assign engagement scores based on a mapping generated by mapping module 138. For instance, engagement module 142 can assign weights to user actions indicated in a mapping and combine the weights, (e.g., average the weights, sum the weights, etc.) to determine a respective engagement score of a visitor at each time interval.

Additionally or alternatively, engagement module 142 may rank visitors according to their respective engagement scores, and determine one or more visitors having an engagement level below a threshold engagement level according to the ranking. For instance, engagement module 142 may take a percentile of the ranking as low-engagement visitors (e.g., the bottom 30% of the ranking), applying a threshold engagement score to the ranking and taking those visitors having respective engagement scores below the threshold engagement score as low-engagement visitors, combinations thereof, and the like.

In one example, engagement module 142 determines one or more visitors having an engagement level above a threshold engagement level, such as high-performing visitors, e.g. visitors who purchase items, write reviews about items, assign high ratings to items, drive discussions in a chat, cause other visitors to participate in a chat, and the like. Hence, system 500 may pair low-engagement visitors determined by engagement module 142 with other low-engagement visitors determined by engagement module 142, high-engagement visitors determined by engagement module 142, or combinations thereof. In one example, engagement module 142 determines a high-engagement visitor for a respective item of the online session that engagement module 142 has also determined a low-engagement visitor. System 500 may then communicate with the high-engagement visitor, such as with a chat, text message, or voice call, to determine whether the high-engagement visitor is willing to discuss the item with the low-engagement visitor, such as via a chat, text message, or voice call with the low-engagement visitor. In another example, engagement module 142 may communicate with a seller of an item regarding possible improvements to the seller's website. In some cases, system 500 may then communicate with the seller, such as with a chat, text message, or voice call, to determine whether the seller is willing to discuss an item with a low-engagement visitor, such as via a chat, text message, or voice call with the low-engagement visitor.

Engagement module 142 provides a list of visitors to context preparation module 144. In one example, engagement module 142 provides a list of low-engagement visitors (e.g., one or more visitors in an online session having an engagement level in the online session below a threshold engagement level) to context preparation module 144. Additionally or alternatively, engagement module 142 can provide a list of high-engagement visitors (e.g., one or more visitors in an online session having an engagement level in the online session above a different threshold engagement level) to context preparation module 144. In one example, engagement module 142 provides a list of ranked engagement scores for visitors to context preparation module 144, such as at each predetermined time interval of a timeline.

Context preparation module 144 receives a list of visitors (e.g., low-engagement visitors) from engagement module 142 and a mapping from mapping module 138. Context preparation module 144 determines context of an online session (e.g., content and visitors) for increasing an engagement level of a low-engagement visitor identified on a list of visitors from engagement module 142. Context preparation module 144 can determine context (e.g., content and visitors) for increasing an engagement level of a low-engagement visitor in any suitable way.

In one example, context preparation module 144 determines visitors of the online session that correlate to a low-engagement visitor based on a mapping generated by mapping module 138. For instance, context preparation module 144 may determine visitors of the online session that correlate to a low-engagement visitor by identifying visitors via the mapping that interacted with the same items, removed the same items from a shopping cart, provided similar ratings or reviews of item, read the same descriptions of an item, as a low-engagement visitor. Context preparation module 144 may then determine content for increasing the engagement level of the low-engagement visitor based on the visitors identified from the mapping, such as content related to a question asked by a visitor who participated in a same chat or conversation as the low-engagement visitor. Additionally or alternatively, context preparation module 144 may determine content for increasing an engagement level of a low-engagement visitor from a different online session as a current online session, such as a shopping session from a previous day.

Context preparation module 144 provides context (e.g., content and identifiers of visitors) for increasing an engagement level of a low-engagement visitor to conversation assistant module 146. In one example, context preparation module 144 provides shopping session data to service provider 110 hosting the online session. For instance, context preparation module 144 may provide data regarding low-engagement visitors, without explicitly identifying the low-engagement visitors, such as a number of low-engagement visitors during each time interval of an online session, content for which visitors are low-engaging, and the like, to service provider 110. Service provider 110 may take steps to increase the engagement level of low-engaging visitors.

Conversation assistant module 146 communicates context determined by context preparation module 144 to a visitor in an online session, such as a low-engagement visitor (e.g., visitor 104), an administrator (e.g., administrator 108), or a combination thereof. In the example in FIG. 5, conversation assistant module 146 forms a client communication with visitor 104 and an administrator communication with administrator 108. Conversation assistant module 146 forms a client communication with visitor 104, illustrated in FIG. 5 as dialog box 502. Dialog box 502 can indicate any suitable communication between conversation assistant module 146 and visitor 104, such as a chat, phone call, audio conference, video conference, text, combinations thereof, and the like. Communication 300 in FIG. 3 is an example of a client communication between conversation assistant module 146 and visitor 104.

Conversation assistant module 146 may also form a seller communication with administrator 108, illustrated in FIG. 5 as communication 504. Communication 504 can indicate any suitable communication between conversation assistant module 146 and administrator 108, such as a chat, phone call, audio conference, video conference, text, combinations thereof, and the like. In the example in FIG. 5, communication 504 includes a visitor list (e.g. a list of low-engagement visitors) and a list of content (e.g., content presented during the online session for which visitors are identified as low-engagement visitors). Communication 500 in FIG. 5 is an example of a client communication between conversation assistant module 146 and administrator 108.

System 500 can perform any operation described above at any suitable time. For instance, system 500 may obtain user data and device data from application 118 and determine low-engagement visitors for time intervals defined by configuration parameters provided to timing module 140. Hence, system 500 may form a communication to a visitor or presenter multiple times during an online session.

System 500 constitutes an improvement over systems that do not track visitor engagement in an online shopping session. By monitoring user actions during an online session, system 500 accurately tracks engagement levels of visitors during an online session relative to content of the online session. Hence, system 500 can efficiently identify low-engagement visitors having a high probability of dropping out of an online session, and actively communicate context for the online session (e.g., content and other visitor identities) to increase a visitor's engagement level in the online session. Furthermore, system 500 can communicate context of an online session to a seller of items for an online session, so the seller can take active steps to assist low-engagement visitors during the online session, such as by providing more detailed information regarding a particular item, answering a question about an item, and so forth. Accordingly, system 500 increases the usefulness of an online session (e.g., an online shopping session with an e-commerce website) by increasing the engagement level of low-engagement visitors and preventing them from dropping out of the online session, making the online session efficient for the visitors and the seller.

Having considered an example system 500, consider now a discussion of example procedures for improving visitor engagement and control in an online session with a listing platform in accordance with one or more aspects of the disclosure.

Example Procedures

Figure 6:
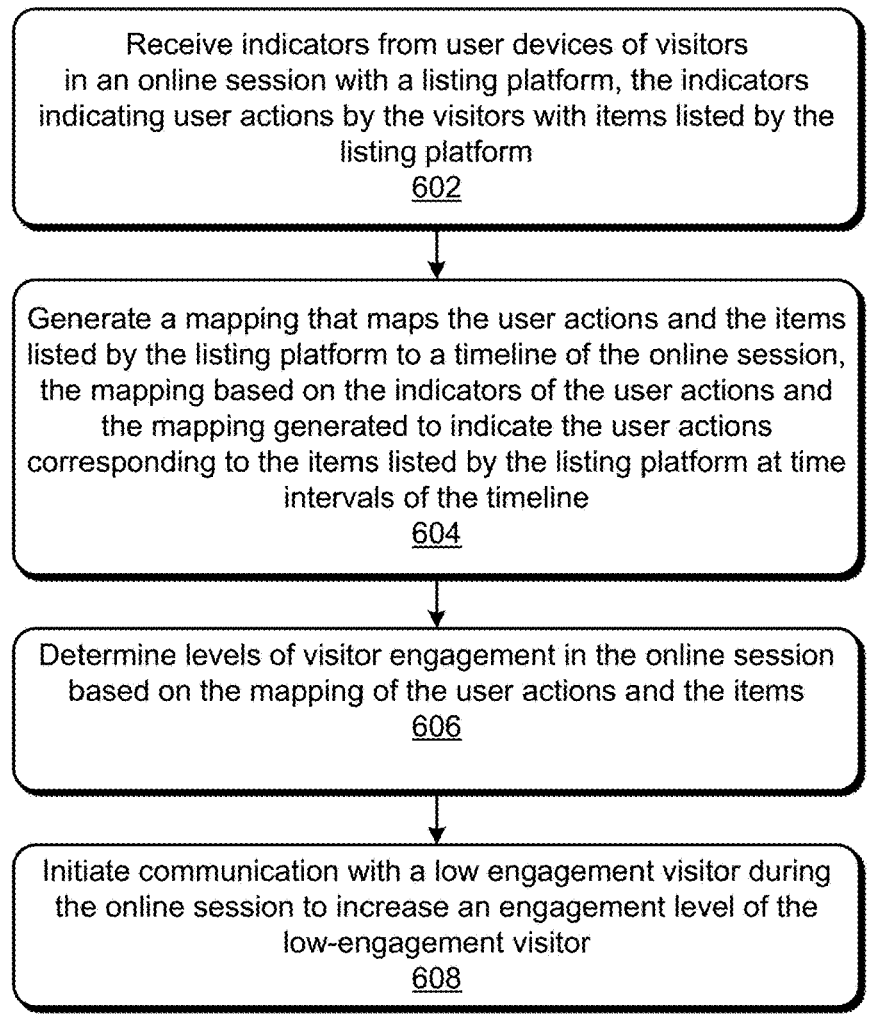
FIG. 6 illustrates a flow diagram depicting an example procedure in accordance with one or more aspects of the disclosure.

FIG. 6 illustrates an example procedure 600 in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more components of server 112 of FIG. 1 that make use of a visitor engagement system, e.g., visitor engagement system 114. A visitor engagement system implementing procedure 600 may be an independent application that has been installed on the computing device, a service hosted by a service provider that is accessible by the computing device, a plug-in module to the computing device, or combinations thereof.

Indicators are received from user devices of visitors in an online session with a listing platform, the indicators indicating user actions by the visitors with items listed by the listing platform (block 602). In one example, monitoring module 136 receives indicators from user devices of visitors in an online session, the indicators indicating user actions of the visitors during the online session. The indicators may indicate any suitable actions or inputs made by a visitor during the online session, such as selection of an item, placing an item in a digital shopping cart, removing an item from a digital shopping cart, minimizing a user interface that exposes the shopping session, interacting with other materials presented by the listing platform (e.g., reading item reviews, watching videos, and the like), writing an item review, providing an item rating, reading a profile of an item seller or other items listed by the same seller, and the like. Other actions may also be monitored which may be indicative of visitor engagement, including slowing or reducing mouse movement or touch-initiated scrolling and selection, reducing navigation between items, remaining on a website for a long period of time with little engagement or interaction, and so forth.

A mapping is generated to map the user actions and the items listed by the listing platform to a timeline of the online session, where the mapping is based on the indicators of the user actions and the mapping is generated to indicate the user actions corresponding to the items listed by the listing platform at time intervals of the timeline (block 604). For example, mapping module 138 generates a mapping of the user actions and the items listed by the listing platform to a timeline of the online session, where the mapping is based on the indicators of the user actions and the mapping is generated to indicate the user actions corresponding to the items listed by the listing platform at time intervals of the timeline.

Levels of visitor engagement in the online session are determined based on the mapping of the user actions and the items (block 606), and a communication is initiated with a low-engagement visitor during the online session during the online session to increase an engagement level of the low-engagement visitor (block 608). For example, engagement module 142 determines levels of visitor engagement in the online session based on the mapping of the user actions and the items, initiates communication with the low-engagement visitor during the online session to increase engagement of the low-engagement level of the low-engagement visitor.

In some cases, to determine the engagement level, the engagement module 142 determines a respective score for each visitor in the online session at each time interval of the timeline, where the respective score for a visitor is based on a weighting of the user actions for the visitor at said each time interval as indicated by the mapping, and the respective score indicates a level of visitor engagement of the visitor in the online session. In this case, the engagement module then determines levels of visitor engagement in the online session based on the mapping of the user actions and the content, and determines at least one of the visitors as a low-engagement visitor based on the respective score of the at least one visitor.

In some cases, the engagement module is configured to select and communicate engaging content to the low-engagement visitor as part of the communication. To do so, the context preparation module 144 selects engaging content for increasing the respective engagement level of the low-engagement visitor in the online session based on the mapping. In one example, context preparation module 144 is configured to select the engaging content by determining other visitors of the online session that correlate to the low-engagement visitor based on the mapping, and selecting the content based on the other visitors. Additionally or alternatively, the content is selected to increase the respective engagement level of the low-engagement visitor, and can include content common to the other visitors and the low-engagement visitor.

Next, conversation assistant module 146 initiates communication of the engaging content to the low-engagement visitor in an effort to increase the engagement level of the low-engagement visitor of the online session. In one example, the content is initiated for communication to the low-engagement visitor as at least one of a voice call or a chat message with the low-engagement visitor during the online session. A voice call or chat may be formed as part of the communication based on user preferences of the low-engagement visitor. Additionally or alternatively, conversation assistant module 146 can be configured to initiate communication of an indicator of the engaging content selected for increasing the respective engagement level of the low-engagement visitor to a presenter of the online session.

In one example, engagement module 142 is configured to determine at least one additional visitor as an engaged visitor in the online session based on the respective score of the additional visitor being greater than a threshold engagement score, and conversation assistant module 146 is configured to establish communication between the low-engagement visitor and the engaged visitor. Additionally or alternatively, communicating the content to the low-engagement visitor can include opening a communication between the low-engagement visitor and an additional visitor having a respective engagement level in the online session above a threshold engagement level, such as a high-engagement visitor.

Having considered example procedures in accordance with one or more implementations, consider now example systems and devices that can be utilized to practice the inventive principles described herein.

Example Systems and Devices

FIG. 7 illustrates an example system generally at 700 that includes example computing devices 702 (shown as 702-1 through 702-5). Computing devices 702 can be any suitable computing device (e.g., user computing devices). Computing devices 102 in FIG. 1 are examples of computing devices 702. Computing devices 702 may include an on-chip system, multiple computing devices, combinations thereof, or any other suitable computing device or computing system. Accordingly, FIG. 7 illustrates computing devices 702 as one or more of a tablet, a laptop computer, a smart phone, smart eye glasses, and a camera, though these examples are illustrative and in no way are meant to limit the type or number of devices included in computing devices 702.

Furthermore, computing devices 702 are coupled to "cloud" 704 including platform 706 that is representative of one or more computing systems and devices that may implement the various techniques described herein, such as edge servers, global servers, or combinations thereof. This is illustrated through inclusion of visitor engagement application 116, visitor engagement system 114, and server 112 in modules of platform 706, which operate as described above.

Functionality of computing devices 702 may be implemented all or in part through use of a distributed system, such as over a "cloud" 704 via a platform 706. Furthermore, platform 706 may host data accessible by computing devices 702, and therefore computing devices 702 may be required to be authenticated to platform 706.

Platform 706 includes a processing system 708, one or more computer-readable media 710, and one or more I/O interfaces 712 that are communicatively coupled to each other. Although not shown, platform 706 may further include a system bus or other data and command transfer system that couples the various components, one to another.

A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 708 is representative of functionality to perform one or more operations using hardware. Accordingly, processing system 708 is illustrated as including hardware elements 714 that may be configured as processors, functional blocks, and so forth. This may include implementation in hardware as an application specific integrated circuit or other logic device formed using one or more semiconductors. Hardware elements 714 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 120 in FIG. 1 are examples of processing system 708.

Computer-readable media 710 (e.g., computer-readable storage media) is illustrated as including memory/storage 716. Storage 122 in FIG. 1 is an example of memory/storage 716 included in memory/storage 716. Memory/storage 716 may include volatile media (such as random access memory (RAM)), nonvolatile media (such as read only memory (ROM), Flash memory, optical disks, magnetic disks, and so forth), or combinations thereof. Memory/storage 716 may include fixed media (e.g., RAM, ROM, a fixed hard drive, and so on) as well as removable media (e.g., Flash memory, a removable hard drive, an optical disc, and so forth). Computer-readable media 710 may be configured in a variety of other ways as further described below.

Input/output interface(s) 712 are representative of functionality to allow a user (e.g., a system administrator of platform 706) to enter commands and information to platform 706, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, platform 706 may be configured in a variety of ways as further described below to support user interaction.

Platform 706 also includes applications 718. Applications 718 are representative of any suitable applications capable of running on platform 706, and may include a web browser which is operable to access various kinds of web-based resources (e.g., assets, media clips, images, content, configuration files, services, user profiles, advertisements, coupons, and the like. Applications 718 include visitor engagement application 116 and application 118, as previously described. Furthermore, applications 718 includes any applications supporting visitor engagement system 114 or system 500.

Cloud 704 includes and is representative of a platform 706. Platform 706 abstracts underlying functionality of hardware (e.g., servers) and software resources of cloud 704, and includes resources 720. Resources 720 may include applications, data, services, and content that can be utilized while computer processing is executed on servers that are remote from computing devices 702. Resources 720 can also include services provided over the Internet, through a subscriber network, such as a cellular or Wi-Fi network, or combinations thereof.

Resources 720 include an online session store 722, which operates to provide data for an online session to one of computing devices 702, such as a user interface for an online session, content for an online session, combinations thereof, and the like. Hence, resources 720 may have access to a service provider that hosts online sessions, such as service provider 110 in FIG. 1, and a presenter of an online session.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by platform 706. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the platform 706, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 714 and computer-readable media 710 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 714, or combinations thereof. Platform 706 may be configured to implement particular instructions and functions corresponding to the software and hardware modules. Accordingly, implementation of a module that is executable by platform 706 as software may be achieved at least partially in hardware, e.g., through use of computer-readable storage media and hardware elements 714 of processing system 708. The instructions and functions may be executable/operable by one or more articles of manufacture (for example, processing system 708) to implement techniques, modules, and examples described herein.

CONCLUSION

In one or more implementations, a digital medium environment includes at least one computing device. Systems, devices, and techniques are described herein for improving visitor engagement detection and control in an online session with a listing platform, such as an online shopping session. User actions during an online session are monitored, and engagement levels of visitors are tracked. Low-engagement visitors having an engagement level below a threshold engagement level, and therefore having a high probability of dropping out of the online session, are identified. Content is determined to increase an engagement level of low-engagement visitors, and a communication channel is opened to communicate the content to the low-engagement visitor. Furthermore, identifiers of content and low-engagement visitors can be communicated to a presenter of an online session, so the presenter can take active steps to assist low-engagement visitors during the online session. Accordingly, the usefulness of an online session is improved by increasing the engagement level of low-engagement visitors and preventing them from dropping out of the online session, making the online session efficient for the visitors and the presenter.

Although implementations of a visitor engagement detection and control system in online sessions have been described in language specific to features and/or methods, the appended claims are not necessarily limited to the specific features or methods described. Rather, the specific features and methods are disclosed as example implementations of a visitor engagement detection and control system in online sessions, and other equivalent features and methods are intended to be within the scope of the appended claims. Further, various different examples are described and it is to be appreciated that each described example can be implemented independently or in connection with one or more other described examples.

The invention claimed is:

1. A visitor engagement system implemented by a computing device in a digital medium environment, the visitor engagement system including modules implemented at least partially in hardware of the computing device, the visitor engagement system comprising:
a monitoring module to receive indicators from user devices of visitors in an online session with a listing platform, the indicators indicating user actions by the visitors with items listed by the listing platform;
a mapping module to generate, in real-time during the online session, a mapping of the user actions and the items listed by the listing platform to a timeline of the online session, the mapping based on the indicators of the user actions and the mapping generated to indicate the user actions corresponding to the items listed by the listing platform at time intervals of the timeline of the online session; and
an engagement module to determine, in real-time during the online session, that at least one of the visitors is a low-engagement visitor based on the mapping of the user actions and the items during the online session, establish a direct communication channel between the low-engagement visitor and an engaged visitor in the online session during the online session, and before the online session is terminated, to increase an engagement level of the low-engagement visitor, and form a communication with an administrator of the listing platform to provide feedback to the administrator regarding one or more of the items listed on the listing platform based on the indicators of the user actions received by the monitoring module.

2. The visitor engagement system as described in claim 1, wherein the engagement module is further configured to determine a respective score for each visitor in the online session at each time interval of the timeline, the respective score for a visitor based on a weighting of the user actions for the visitor at said each time interval as indicated by the mapping, the respective score indicating a level of visitor engagement of the visitor in the online session, wherein the engagement module determines the low-engagement visitor based on the respective score of the low-engagement visitor.

3. The visitor engagement system as described in claim 2, wherein the engagement module is further configured to identify the engaged visitor based on the respective score of the engaged visitor being greater than a threshold engagement score.

4. The visitor engagement system as described in claim 1, wherein the engagement module is further configured to establish communication between the low-engagement visitor and the administrator of the listing platform.

5. The visitor engagement system as described in claim 1, wherein the user actions include page navigations to the items, selections of the items, downloads of the items, purchases of the items, placing an item in a digital shopping cart, or removing the item from the digital shopping cart.

6. The visitor engagement system as described in claim 1, wherein the user actions further include user actions with respect to material presented by the listing platform, reviews of items listed by the listing platform, ratings of items listed by the listing platform, or comments between visitors of the listing platform.

7. The visitor engagement system as described in claim 1, wherein the engagement module is configured to initiate communication of engaging content to the low-engagement visitor, the engaging content selected to increase an engagement level of the low-engagement visitor of the online session.

8. The visitor engagement system as described in claim 1, wherein the engagement module is configured to establish the direct communication channel between the low-engagement visitor and the engaged visitor as a voice call.

9. The visitor engagement system as described in claim 1, wherein the engagement module establishes the communication channel by establishing a chat session between the low-engagement visitor and the engaged visitor.

10. One or more computer-readable storage devices comprising instructions stored thereon that, responsive to execution by one or more processors, perform operations comprising:
receiving indicators from user devices of visitors during an online session with a listing platform, the indicators indicating user actions of the visitors during the online session;
generating, in real-time during the online session, a mapping of the user actions to time intervals of the online session for each user device, the mapping based on the indicators of the user actions and the mapping generated to indicate the user actions at the time intervals of the online session;
determining a respective score for each visitor in the online session at each time interval, in real-time during the online session, based on the mapping of the user actions, the respective score based on a weighting of the user actions for said each visitor at said each time interval as indicated by the mapping and based on summing results of the weighting, the respective score indicating a level of visitor engagement of said each visitor in the online session;
in real-time during the online session and before the online session is terminated, determining at least one of the visitors as a low-engagement visitor based on the respective score of the low-engagement visitor being below a threshold interaction score and establishing a direct communication channel between the low-engagement visitor and an engaged visitor in the online session during the online session, and before the online session is terminated, to increase an engagement level of the low-engagement visitor; and
forming a communication with an administrator of the listing platform to provide feedback to the administrator regarding one or more items listed on the listing platform based on the received indicators of the user actions.

11. The one or more computer-readable storage devices as described in claim 10, wherein the indicators indicate user actions by the visitors with items listed by the listing platform.

12. The one or more computer-readable storage devices as described in claim 11, wherein the mapping is based on the indicators of the user actions and the mapping generated to indicate the user actions corresponding to the items listed by the listing platform at time intervals of a timeline.

13. The one or more computer-readable storage devices as described in claim 10, wherein the operations further comprise identifying the engaged visitor in the online session based on the respective score of the engaged visitor.

14. The one or more computer-readable storage devices as described in claim 10, wherein the operations further comprise establishing communication between the low-engagement visitor and the administrator of the listing platform.

15. The one or more computer-readable storage devices as described in claim 10, wherein the user actions include page navigations to items listed by the listing platform, selections of the items listed by the listing platform, downloads of the items listed by the listing platform, purchases of the items listed by the listing platform, placing an item in a digital shopping cart, removing the item from the digital shopping cart, user interactions with material presented by the listing platform, reviews of the items listed by the listing platform, ratings of items listed by the listing platform, or comments between visitors of the listing platform.

16. The one or more computer-readable storage devices as described in claim 10, wherein the establishing the direct communication channel between the low-engagement visitor and the engaged visitor comprises establishing a voice call between the low-engagement visitor and the engaged visitor.

17. The one or more computer-readable storage devices as described in claim 10, wherein the communication channel is established by establishing a chat session between the low-engagement visitor and the engaged visitor.

18. A system comprising:
at least a memory and a processor to perform operations comprising:
a monitoring module to receive indicators from user devices of visitors in an online session with a listing platform, the indicators indicating user actions by the visitors with items listed by the listing platform;
a mapping module to generate, in real-time during the online session, a mapping of the user actions and the items listed by the listing platform to a timeline of the online session, the mapping based on the indicators of the user actions and the mapping generated to indicate the user actions corresponding to the items listed by the listing platform at time intervals of the timeline of the online session; and
an engagement module to determine, in real-time during the online session, that at least one of the visitors is a low-engagement visitor based on the mapping of the user actions and the items during the online session, and establish a direct communication channel between the low-engagement visitor and an administrator of the listing platform during the online session, and before the online session is terminated, to increase an engagement level of the low-engagement visitor.

19. The system as described in claim 18, wherein the engagement module establishes the direct communication channel by establishing a chat session between the low-engagement visitor and the administrator of the listing platform.

20. The system as described in claim 18, wherein the user actions include page navigations to the items, selections of the items, downloads of the items, purchases of the items, placing an item in a digital shopping cart, or removing the item from the digital shopping cart.

* * * * *